3,390,267
Patented June 25, 1968

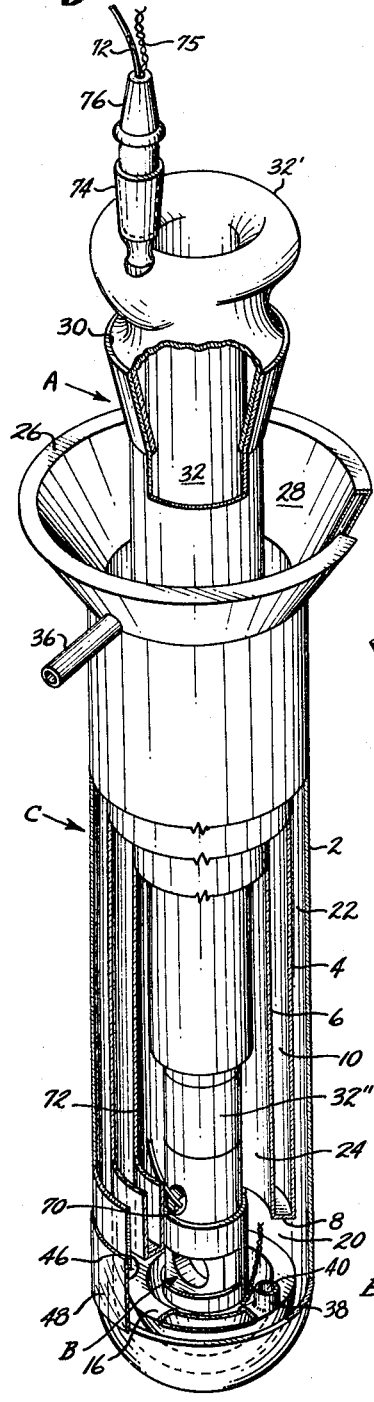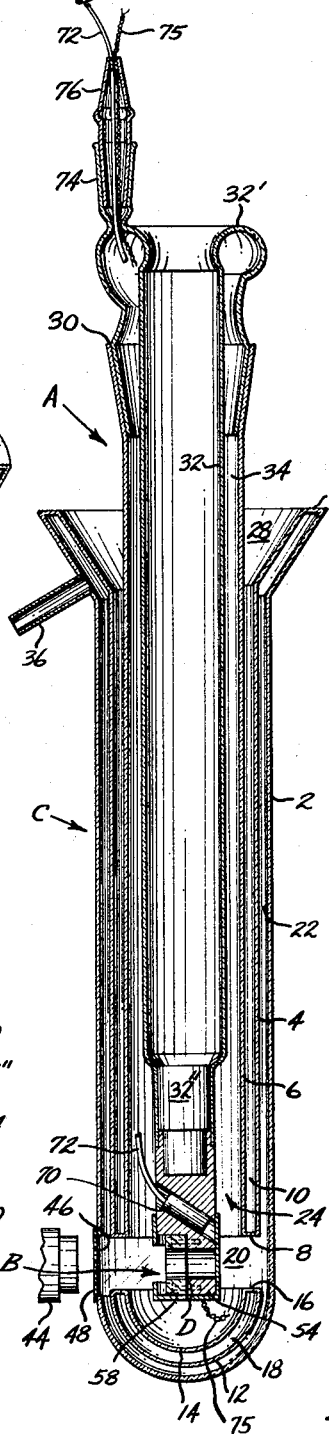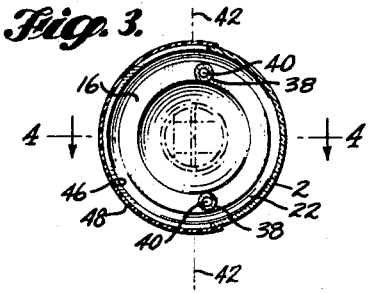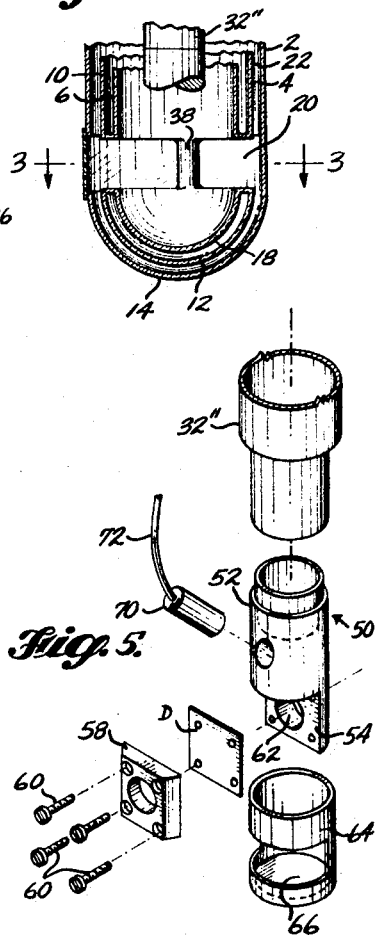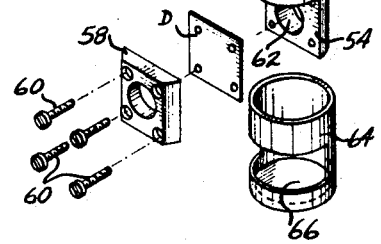
INVENTOR.
CZESLAW DEMINET
BY
Reynolds + Christensen
ATTORNEYS

United States Patent Office

3,390,267
X-RAY CRYOSTAT
Czeslaw Deminet, Seattle, Wash., assignor to The Boeing Company, Seattle, Wash., a corporation of Delaware
Continuation of application Ser. No. 304,480, Aug. 26, 1963. This application May 5, 1965, Ser. No. 456,036
12 Claims. (Cl. 250—51.5)

ABSTRACT OF THE DISCLOSURE

A method and apparatus are disclosed by which glass can be used to fashion a Dewar that is suitable for X-ray diffractions. The Dewar is commonly assembled with a narrow circumferential slot about one side thereof which has a continuously open angular extent of at least 180°. The vertical extent of the slot may be as little as ⅛ inch, that is, sufficient to pass an X-ray beam but no more. The Dewar is also structured so that stresses created in use at liquid nitrogen temperatures are balanced at all points on and around the Dewar.

---

The application is a continuation of my co-pending application Ser. No. 304,480, filed Aug. 26, 1963 and now abandoned.

This invention relates to thermally insulative vessels which are adapted for the spectroscopic examination of temperature controlled materials. It relates in particular to vessels of this type which are adapted for use in cryostats operable to conduct both X-ray absorption and diffraction studies on crystalline substances.

A principal object of the invention is to provide an X-ray cryostat in which the thermal insulation shield is fashioned from glass and adapted for use in both X-ray absorption and diffraction studies on crystalline substances. Such a cryostat can be referred to for practical purposes as a glass cryostat.

Glass cryostats for optical studies of gases condensed at liquid helium temperatures have been described previously. The early designs were based on an assembly of four concentric glass cylinders or spheres forming liquid helium and liquid nitrogen storage chambers isolated from each other and from the room temperature wall by a common vacuum space. The liquid helium cooled "cold surface" serving as the sample holder was located near the bottom of the cryostat by means of a so-called "cold finger," and enclosed by a liquid nitrogen cooled thermal insulation shield. Deposition and viewing of the sample were accomplished by means of openings in the shield, together with siutable entrance ports or windows mounted on a detachable outer glass housing. All internal glass surfaces were strip silvered to permit visual monitoring of the liquid helium level.

To my knowledge, however, a glass cryostat has never been constructed which is operable for performing both X-ray absorption and diffraction studies on crystalline substances. There is the problem in such dual-purpose apparatus that the thermal insulation shield around the sample or specimen must permit the operator to scan the entire diffraction angle yet still protect the sample from all sides to assure that his results will be accurate. The two are difficult to reconcile from a structural standpoint when using glass, and heretofore cryostats enabling both absorption and diffraction studies were constructed for the most part from metals such as stainless steel. As such, they were massive, complicated, quite costly of construction, and had short operating lives due to the fact that their metal parts were interconnected by welded or soldered seams which were both highly susceptible to fatigue in the temperature cycle and highly porous to the helium coolant. This latter condition was especially troublesome, if not dangerous, since even a minute helium leak would result in a substantial volumetric loss of liquid helium through thermal conduction.

The use of glass eliminates most of these defects since the thermal insulation shield can be constructed entirely from a single material. The joints in particular can be made with seams of the Dewar type in which the glass parts are interfused and made integral with one another so that they have the same properties of expansion and contraction as the parts themselves and have no greater porosity than such parts. The use of glass also offers the advantages of greater economy, simplicity and flexibility of design, and enables the weight of the vessel to be reduced to a bare minimum.

It is a further object of my invention to construct a glass cryostat of this type which is quickly and easily fabricated from a minimal number of parts, and which can be fabricated from standard glass materials and with conventional glass forming techniques.

A still further object is to provide a cryostat of this nature which is characterized with a covered viewing port or window that has a low X-ray absorption.

These and other objects and advantages are realized according to the invention by a glass vessel of my conception which can be employed as a thermal insulation shield in a dual-purpose cryostat and which constitutes an assembly of glass parts that are joined in such a way as to provide a so-called "free form" glass structure. Such a structure is characterized in the art by the continuity of parts having a common coefficient of expansion. In the case of my vessel, all of the essential parts are made of glass and are joined by glass seals in such a way as to assure that the internal components are supported entirely from the outer room temperature wall. As a result, no internal stresses can rise during the temperature cycle which might cause fatigue.

The glass vessel has thermally-continuous inner and outer components. The outer component comprises an upright tubular container having a closed bottom. The inner component comprises a pair of upright tubular baffles which are cooperatively disposed and joined by a transverse seam so as to form a first annular basin for the containment of a liquid. It also comprises a pair of upright cuplike baffles which are likewise cooperatively disposed and joined by a transverse seam so as to form a second annular basin constituting an operative extension of the first. The basins have apertures in their seams for reasons which will appear and are supported generally coaxially within the tubular container, with the second being disposed under the first and in spaced relation thereto so as to form a slotted annular opening between the two in a transverse plane of the container. The basins are also spaced from the inner surfaces of the container so as to form a thimble chamber therebetween, there being a transverse seam across the upper end portion of the chamber to close it at such end. The seams are preferably of the Dewar type.

A hollow glass strut is used to interconnect the basins. The strut is disposed upright across the slotted opening and serves to interconnect the apertures in the basins for the transfer of the liquid between the two. So as to make the vessel suitable for both X-ray absorptions and diffractions, the angular extent of the strut in the opening is limited to less than 180° and the container is ported at the opposite ends of a diametrical line of the opening which lies entirely outside of the strut.

In use, the porting is covered with a low X-ray absorption material, preferably Mylar (a Du Pont polyethylene terephthalate product), and a conventional "cold finger" is inserted into the well formed within the inner component so as to suspend the cold surface and the sample or specimen across the aforementioned diametrical line. The cold finger forms a thimble chamber between it and the inner surfaces of the inner component, which chamber communicates through the slotted annular opening with the thimble chamber in the vessel itself. The apparatus becomes entirely operative when the two basins of the inner component are filled with a coolant liquid such as liquid nitrogen and the thimble chambers are evacuated. The specimen can be examined for absorption along the diametrical line, and by providing porting in the container sufficient to define a 180° arc on the opposite side of the line from the strut, it can be examined for diffraction as well by sweeping the arc.

The invention will be better understood by reference to the accompanying drawing which illustrates a preferred embodiment without limiting the invention thereto.

In the drawing, FIGURE 1 is an isometric view of the inventive vessel as used in an X-ray cryostat, with parts of certain elements removed to open the interior of the vessel to view;

FIGURE 2 is a longitudinal cross-section of the cryostat with an X-ray scanner shown in operative position to one side of it;

FIGURE 3 is a cross-sectional view of the vessel taken alonge the line 3—3 of FIGURE 4;

FIGURE 4 is a cross-sectional view of the vessel taken along the line 4—4 of FIGURE 3; and FIGURE 5 is an exploded view of the "cold surface" housing chosen for the cryostat.

For ease of illustration, only the working structural elements of the cryostat have been shown in the drawing, all support for the latter and all operating liquids having been omitted. These consist of the cold finger A having a cold surface housing B thereon, and a vessel C constituting the thermal insulation shield for the cold finger. A support for the cryostat might comprise a conventional barrel-back stand in which the vessel C is secured by springs or other such means.

The invention is principally concerned with the thermal insulation vessel C, the cold finger and the cold surface housing in themselves being largely conventional. The vessel comprises an assembly of inner and outer glass components, the outer of which consists essentially of a tubular container 2 which has a closed bottom and is upright in position. The inner component has a plurality of parts including a pair of spaced generally concentric upright tubular baffles 4 and 6, the lower end portions of which are joined by a transverse Dewar seam 8 so as to form an annular sink or basin 10 between the baffles for the containment of a coolant liquid such as liquid nitrogen. It also includes a pair of spaced generally concentric upright cup-like baffles 12 and 14, the rim portions of which are also joined by a transverse Dewar seam 16 so as to form another annular sink or basin 18 which constitutes an operative extension of the basin 10.

The basins are supported (in a manner to be described) generally coaxially within the container 2 with the basin 18 disposed under the basin 10 and in spaced relation thereto so as to form a slotted annular opening 20 between the two which lies in a transverse plane of the container. The basins are also spaced from the inner surface of the container 2 so as to form a thimble-like chamber 22 between the basins and the container. The chamber opens into the interior hollow or well 24 of the vessel through the annular opening 20 but is closed at its upper end by a transverse baffle in the form of a Dewar seam 26 which interconnects the rim portions of the baffle 4 and the container 2.

In the illustrated embodiment the inner component comprised of the baffles 4 and 6 is suspended from the rim of the container 2 by means of the seam 26. While it is recognized that the inner component might be otherwise supported within the container 2, this construction is much to be preferred because it provides a ideal "free form" structural arrangement in which the inner surface of the baffle 6 is ideally thermally inter-connected with the outer room temperature wall of the container 2. Note also that the rim portions of the baffle 4 and the container 2 are outwardly flared to form a funnel 28 for the introduction of the coolant liquid into the basin 10.

The cold finger A is suspended in the well 24 of the vessel in conventional manner by means of a taper and socket joint 30 formed in part by flaring the rim portion of the baffle 6 outwardly. The cold finger is comprised of a conventional liquid helium tube 32 which provides the male fit for the taper and socket joint 30 through the fact that the rim portion 32' of the tube 32 is rolled outwardly and then downwardly into a tapered knob configuration adapted to fit snugly down into the flared rim portion of the baffle 6. The knob also serves to space the main portion of the tube 32 inwardly from the inner surface of the baffle 6 so that a deep cylindrical chamber 34 is formed between the two. The length of the tube below the knob is such as to lower the cold surface housing B across the path of the transverse plane of the opening 20. The housing is thus nestled in the bottom portion of the well 24 but suspended in an elevated position above the bottom so that the well continues to surround the housing to extend the chamber 34 into a thimble-like configuration below the housing. By evacuating the chambers 22 and 34 through a nipple 36 it is therefore possible to isolate each of the cold finger tube 32, the coolant liquid basins 10 and 18, and the room temperature container 2 from one another by means of a common vacuum space. To seal the space at the joint 30, ground glass surfaces are used in the case of each of the knob 32' and the baffle 6.

According to the invention, it is possible to conduct both X-ray absorption and diffraction studies on a specimen within the housing as a consequence of the manner in which the lower basin 18 is suspended from and interconnected with the upper basin 10. Referring in particular to FIGURES 1, 3 and 4 it will be noted that the inner component of the vessel also comprises one or more hollow struts 38 which are disposed upright across the opening 20 and positioned to interconnect apertures 40 in each of the Dewar seams 8 and 16. The basins 10 and 18 thus communicate with one another through the struts and liquid poured into the upper basin 10 will settle into the lower basin 18 to surround the underside of the housing B. However, since the struts occupy an angular segment of less than 180° and lie on a common side of a diametrical line 42 of the opening 20, X-ray apparatus seen schematically at 44 can be sighted along the line 42 for purposes of conducting X-ray absorptions on a crystalline specimen D mounted in the housing. At the same time or alternatively, the apparatus 44 can be used to conduct X-ray diffractions upon rotating the specimen into a parallel with the line as seen, thereby making it possible to sweep the full 180° arc on the opposite side of the line from the struts 38 by causing relative rotation between the apparatus and the cryostat. The apparatus 44 has reached the median point of such a scanning operation in FIGURE 2.

To enable the operations to be conducted conjointly, it is, of course, necessary that the container 2 be ported over an arc of 180° or greater sweeping the entire side of the line 42 opposite to that on which the struts are disposed. Such porting is seen at 46 in the form of a slotted window extending 200° around the container, there being a covering 48 of Mylar over the window to maintain the vacuum condition in the vessel while minimizing absorption of the X-rays used in the two studies.

Turning now to the manner in which the specimen is cooled, it will be noted that the cold finger tube 32 terminates in a Kovar metal tip 32″ (FIGURE 5) to which is silver soldered a copper box 50 that is adapted to house the specimen D. The Kovar metal tip consists of a graded sequence of Pyrex to uranium to Nonex glass to Kovar metal which is capable of withstanding the thermal shock of cooling to 4° K. many times. The copper box 50 has a generally cylindrical body portion 52, the upper section of which is hollowed internally and edge rabbeted to provide a male fit for the tip of the cold finger. The lower section of its body is reduced to form a flat-faced pendant mount 54 for the specimen. The specimen D (FIGURES 2 and 5) takes the form of a thin foil which is clamped against the face of the pendant mount 54 by means of a copper cover plate 58 and copper screws 60 which, as observed, are passed through holes in the plate and thence screwed into threaded holes in the mount 54. The plate 58 is also apertured to conform with an aperture 62 defined by the mount 54 so that the specimen is laid open for examination. A copper reflector sleeve 64 completes the housing, there being a 200° window 66 formed about the sleeve to register with the window 46 in the container 2 for passthrough of the examining beam.

A small bore 68 angled into the midsection of the body 52 serves to house a vapor pressure thermometer 70 which is connected with the exterior of the cryostat by means of a stainless steel tube 72 passed into the chamber 34 through a female nipple 74 formed on the knob 32' of the cold finger. Higher temperatures are measured by means of thermocouples 75 attached to the pendant mount 54 and also introduced through the nipple 74. The opening in the nipple is sealed off by means of a male nipple 76 making a ground glass taper and socket joint with the nipple 74 and itself sealed off with Apiezon wax about the tube and thermocouple leads.

If desired, a copper sponge (not shown) can be pushed down into the cold finger tube 32 to a point just above the surface of the liquid helium coolant. Such a sponge provides an additional cold barrier so that the coolant cannot receive direct radiation down the tube and also provides a heat exchanger to intercept heat leaking down through the glass walls of the tube.

The exterior surfaces of the various tubular members 32, 6, 4, and 2 are normally plated with silver and polished for maximum reflectivity. However, for clarity of illustration, the silver coatings have been omitted from the drawing.

The Mylar strip 48 is cemented over ground glass edges of the window 46 by means of epoxy resin sealed over with Clyptal. Where visual observation of the specimen is not required, the Mylar strip may also be aluminized or silver coated for additional shielding.

Temperature control can be effected in conventional fashion by means of resistance heating applied at the tip 32".

The vessel is constructed with the use of a glass blowing lathe and conventional glass forming practices. The various tubular members illustrated in the drawing can assume other longitudinal cross sections and can be joined in transverse Dewar seams which include a fillet member, all without departing from the invention. The struts need not assume a vertical disposition as shown. It will also be appreciated that the vessel can be used in a reverse sense as a means for applying heat to a specimen. Still other changes and additions will appear to one skilled in the art.

I claim as my invention:

1. A method of making a glass Dewar for X-ray absorption and diffraction studies, comprising (1) constructing a circumferentially slotted double-walled glass vessel by arranging a pair of glass tubes in spaced concentric relationship to one another and interconnecting the tubes around corresponding ends thereof with a glass seal so as to form a bottom for the space between the tubes; arranging a pair of glass cups in spaced concentric relationship to one another and interconnecting the cups around their rims with a glass seal so as to form a ceiling over the space between the cups; forming a pair of apertures in each of the seals at points lying on a common side of a diametrical line through the seal; arranging the tubes and cups in generally coaxial relationship to one another with the seals and apertures generally opposed to one another and spaced apart so that an annular slot is formed between the seals, the slot being narrow in relation to its circumference; inserting a pair of thin hollow glass struts into the slot between the apertures and interconnecting the ends of the same and the seals with additional glass seals formed about the apertures so that the spaces between the tubes and the cups can communicate with one another through the struts, the struts being disposed so that the slot has a continuously open angular segment of at least 180° between the struts; (2) suspending the double walled vessel upright, with the cups below the tubes, in spaced concentric relationship within an upright tubular vessel of glass having a closed bottom and a circumferential window in the side wall thereof of at least 180° continuously open angular extent, the window and slot being arranged in a common horizontal plane, with the window opposite the aforesaid open segment of the slot; and (3) interconnecting the upper ends of the tubular vessel and the outer of the tubes with a glass seal so as to form a ceiling over the space between the vessels.

2. The method according to claim 1 wherein each of the glass seals is formed by the Dewar method.

3. The method according to claim 1, further comprising covering the window in the tubular vessel with a low X-ray absorption material.

4. The method according to claim 3, further comprising forming a vacuum nipple in the wall of the tubular vessel, and removably suspending a cold finger in spaced concentric relationship within the inner of the tubes so that its cold surface is disposed in the aforesaid opposite the window, and the space between the finger and the inner tube is sealed off at the upper end of the latter to enable evacuating the Dewar through the nipple.

5. A method of making a double-walled glass vessel which is circumferentially slotted for 180°, comprising arranging a pair of glass tubes in spaced concentric relationship to one another and interconnecting the tubes around corresponding ends thereof with a glass seal so as to form a bottom for the space between the tubes; arranging a pair of glass cups in spaced concentric relationship to one another and interconnecting the cups around their rims with a glass seal so as to form a ceiling over the space between the cups; forming a pair of apertures in each of the seals at points lying on a common side of a diametrical line through the seal; arranging the tubes and cups in generally coaxial relationship to one another with the seals and apertures generally opposed to one another and spaced apart so that an annular slot is formed between the seals, the slot being narrow in relation to its circumference; and inserting a pair of thin hollow glass struts into the slot between the apertures and interconnecting the ends of the same and the seals with additional glass seals formed about the apertures so that the spaces between the tubes and the cups can communicate with one another through the struts, the struts being disposed so that the slot has a continuously open angular segment of at least 180° between the struts.

6. A glass Dewar comprising an upright outer tubular vessel of glass having a closed bottom and a circumferential window in the side wall thereof of at least 180° continuously open angular extent about the vessel, and a double walled inner tubular vessel of glass suspended upright in spaced concentric relationship within the outer vessel and connected with the upper end of the same by a glass seal so as to form a ceiling over the space between the vessels, said inner tubular vessel comprising a pair of upright glass tubes which are arranged in spaced concentric relationship to one another and interconnected around their lower ends by a glass seal which forms a bottom for the space between the tubes, a pair of upright glass cups which are arranged in spaced concentric relationship to one another and interconnected around their rims by a glass seal which forms a ceiling over the space between the cups, the cups and tubes being generally coaxial with one another and arranged within the outer vessel so that the cups are disposed below the tubes and the seals of the tubes and cups are spaced apart from one another by an annular slot which is disposed in the plane of the window and narrow in relation to its circumference, each of the tube and cup seals having a pair of apertures therein at points lying on a common side of a diametrical line through the seal, and a pair of thin hollow glass struts which are interposed in the slot between the tube and cup seals and connected at their ends with the seals about the apertures by additional glass seals so that the spaces between the tubes and the cups can communicate with one another through the struts, said struts being disposed so that the slot has a continuously open angular segment which extends for at least 180° about the vessels, opposite the window and between the struts.

7. A glass Dewar according to claim 6 wherein each of the glass seals is a Dewar seal.

8. A glass Dewar according to claim 6 wherein each of the window and the segment of the slot has a continuously open angular extent of 200° about the vessels.

9. A glass Dewar according to claim 6 having a vacuum nipple formed in the wall of the outer tubular vessel, and a cold finger removably suspended within the inner of the tubes, and in spaced concentric relationship therewith, the cold finger being engaged airtight around the inner end of the inner tube, and the cold surface of the finger being disposed in the aforesaid plane, opposite the window.

10. A glass Dewar according to claim 6, wherein the window is covered with a low X-ray absorption material.

11. A glass Dewar according to claim 10, wherein the window covering is a polyethylene terephthalate material.

12. Apparatus for carrying out X-ray absorption and diffraction studies, comprising (1) a glass Dewar comprising an upright outer tubular vessel of glass having a closed bottom and a circumferential window in the side wall thereof of at least 180° continuously open angular extent about the vessel, and a double walled inner tubular vessel of glass suspended upright in spaced concentric relationship within the outer vessel and connected with the upper end of the same by a glass seal so as to form a ceiling over the space between the vessels, said inner tubular vessel comprising a pair of upright glass tubes which are arranged in spaced concentric relationship to one another and interconnected around their lower ends by a glass seal which forms a bottom for the space between the tubes, a pair of upright glass cups which are arranged in spaced concentric relationship to one another and interconnected around their rims by a glass seal which forms a ceiling over the space between the cups, the cups and tubes being generally coaxial with one another and arranged within the outer vessel so that the cups are disposed below the tubes and the seals of the tubes and cups are spaced apart from one another by an annular slot which is disposed in the plane of the window and narrow in relation to its circumference, each of the tube and cup seals having a pair of apertures therein at points lying on a common side of a diametrical line through the seal, and a pair of thin hollow glass struts which are interposed in the slot between the tube and cup seals and connected at their ends with the seals about the apertures by additional glass seals so that the spaces between the tubes and the cups can communicate with one another through the struts, the struts being disposed so that the slot has a continuously open angular segment which extends for at least 180° about the vessels, opposite the window and between the struts; (2) a low X-ray absorption material covering the window; (3) a vacuum nipple formed on the outer tubular vessel; (4) a cold finger removably suspended in the Dewar, in spaced concentric relationship within the inner of the tubes, and engaged airtight around the upper end of the inner tube, the cold surface of the finger being disposed in the aforesaid plane, opposite the window; and (5) means for directing an X-ray beam at the cold surface through the window and the segment of the slot, and measuring the absorption and/or diffraction of the X-ray by a specimen on the surface.

References Cited
UNITED STATES PATENTS

| | | | |
|---|---|---|---|
| 2,826,701 | 3/1958 | Columbe | 250—49.5 |
| 3,030,539 | 4/1962 | Di Ianni | 313—93 |
| 2,521,048 | 9/1950 | Day | 65—58 |
| 3,195,994 | 7/1965 | Lindsay | 65—58 |
| 2,543,825 | 3/1951 | Beu et al. | 250—51.5 |
| 3,112,398 | 11/1963 | Shimula | 250—51.5 |

OTHER REFERENCES

Low Temperature X-Ray Diffraction Techniques, by W. L. Baun et al., A Technical Doc. Report, NOASDTDR–63–278, April 1963, pp. 1 to 18.

Glass Dewars for Optical Studies at Low Temperatures, by L. J. Schoen et al. from The Review of Scientific Instruments, vol. 29, No. 7, July 1958, pp. 633 to 638.

S. LEON BASHORE, *Primary Examiner.*

RALPH G. NILSON, DONALL H. SYLVESTER, *Examiners.*

W. F. LINDQUIST, F. W. MIGA, *Assistant Examiners.*

UNITED STATES PATENT OFFICE
CERTIFICATE OF CORRECTION

Patent No. 3,390,267　　　　　　　　　　　　　　June 25, 1968

Czeslaw Deminet

It is certified that error appears in the above identified patent and that said Letters Patent are hereby corrected as shown below:

Column 6, line 32, before "opposite" insert -- plane --.
Column 7, line 36, "terephthalate" should read -- teraphthalate --.

Signed and sealed this 18th day of November 1969.

(SEAL)
Attest:

Edward M. Fletcher, Jr.
Attesting Officer

WILLIAM E. SCHUYLER, JR.
Commissioner of Patents